3,317,555
5(6)-TRIFLUOROMETHYLBENZIMIDAZOLE COMPOUNDS
Harry Goldsmith and Robert F. Crawford, both of La Mirada, Calif., assignors to United States Borax & Chemical Corporation, Los Angeles, Calif., a corporation of Nevada
No Drawing. Filed Oct. 22, 1965, Ser. No. 502,502
5 Claims. (Cl. 260—309.2)

This is a continuation-in-part of our copending application Ser. No. 429,632, filed Feb. 1, 1965, which, in turn, is a continuation-in-part of our copending applications Ser. No. 295,828, filed July 17, 1963; Ser. No. 339,334, filed Jan. 22, 1964; and Ser. No. 36,141, filed May 8, 1964.

This invention relates to novel 5(6)-trifluoromethylbenzimidazole compounds.

Benzimidazoles are heterocyclic compounds based on the structure

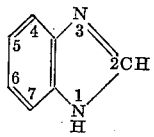

Those benzimidazoles possessing a free imino hydrogen (in the 1-position) are tautomeric systems and the derivatives not possessing a plane of symmetry can exist in two possible tautomeric forms. Thus, the 4- or 5-substituted benzimidazoles can also exist in the 7- or 6-substituted forms, respectively. Therefore, whenever a mono- or polysubstituted benzimidazole not possessing a plane of symmetry is named, it is usually referred to using both positions, as, for example, 5(6)-chlorobenzimidazoles or 4(7)-chlorobenzimidazole. This system of nomenclature is followed in the following description and claims.

According to the present invention, there are provided novel 5(6)-trifluoromethylbenzimidazole compounds of the formula

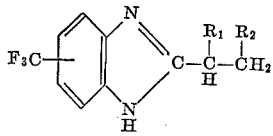

in which the $F_3C-$ radical is at the 5(6) position, $R_1$ is hydrogen, methyl or methoxy, and $R_2$ is hydrogen or combined with $R_1$ to represent $-CH_2-$. Representative compounds of this invention are 2-ethyl-5(6)-trifluoromethylbenzimidazole
2-cyclopropyl-5(6)-trifluoromethylbenzimidazole
2-isopropyl-5(6)-trifluoromethylbenzimidazole
2-(α-methoxyethyl)-5(6)-trifluoromethylbenzimidazole The benzimidazoles of this invention are prepared by reaction of the corresponding trifluoromethyl-substituted o-phenylenediamine with an organic acid in the presence of an aqueous solution of dilute mineral acid such as hydrochloride acid. The reaction takes place at an elevated temperature such as about the reflux temperature of the reaction mixture and the crude product can be isolated from the cooled reaction mixture after treatment with an aqueous base, such as ammonium hydroxide. The crystalline product is purified by conventional procedures, such as recrystallization, and is soluble in alcohols and insoluble in water. The compounds form water-soluble salts with acids such as hydrochloric acid.

The trifluoromethyl benzimidazoles of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plant. Thus, the compounds can be used to control the growth of weeds by applying a phytotoxic amount to the locus of the weeds, that is, to the foliage of the growing weeds or to soil in which the weeds are growing or will grow.

An application rate in the range of from about 0.25 to 50 pounds of one or more of the active compounds per acre is generally an effective phytotoxic amount, although greater or lesser amounts can be used if desired. The presently preferred application rate is in the range of from about 1 to 20 pounds per acre. At lower application rates, such as from about 1 to about 8 pounds per acre, the compounds are useful as selective herbicides for killing weeds in the presence of desirable crops. For example, at the lower rates of application, 2-ethyl-5(6)-trifluoromethylbenzimidazole and 2-cyclopropyl-5(6)-trichloromethylbenzimidazole are especially effective for controlling weed growth in cotton without serious injury to the cotton plants.

The following examples are presented to illustrate the preparation of and herbicidal activity of representative compounds of this invention.

EXAMPLE I 2-isopropyl-5(6)-trifluoromethylbenzimidazole

A solution of 35.2 grams (0.2 mole) of 3,4-diaminobenzotrifluoride and 17.6 grams (0.2 mole) of isobutyric acid in 260 ml. of 4 N aqueous hydrochloric acid was heated at reflux temperature for 16 hours. The reaction mixture was diluted with water and was basified by adding slowly to a cold solution of 4 N ammonium hydroxide. The precipitated solid product was removed by filtration. After treatment with activated charcoal and recrystallization from aqueous ethanol, the pure crystalline product melted at 192°–194° C.

2-isopropyl-5(6)-trifluoromethylbenzimidazole was applied as a methanol solution to corn, millet, ryegrass, oats, peas, mustard, cucumbers and snap beans. The chemical was applied at a rate of 2.7 pounds per acre as both a pre-emergence and post-emergence treatment. Thirty days after application, all plants were dead when the chemical was applied as a pre-emergence treatment, and all plants, except corn, were dead when the chemical was applied as a post-emergence treatment. The corn plants had some injury but were not killed.

EXAMPLE II 2-cyclopropyl-5,(6)-trifluoromethylbenzimidazole

A solution of 17.6 grams (0.1 mole) of 4-trifluoromethyl-o-phenylenediamine and 8.6 grams (0.1 mole) of cyclopropane carboxylic acid in 100 ml. of 4 N hydrochloric acid was heated at reflux for 20 hours. The reaction mixture was cooled, diluted with two volumes of water, and filtered. The filtrate was neutralized with 4 N sodium hydroxide. The precipitated solid was collected by filtration, washed with water, dried, and extracted with ether. The ether extract was evaporated to dryness and the residue was recrystallized from water to yield 0.52 gram of white solid, M.P. 181°–194° C.

Application of the compound as the hydrochloride salt in water, as both a pre-emergence and post-emergence treatment, at a rate of one pound per acre, to wheat, sugar beets, alfalfa and safflower, gave a complete kill or non-emergence of all plants.

EXAMPLE III 2-(α-methoxyethyl)-5(6)-trifluoromethylbenzimidazole

A solution of 17.6 grams (0.1 mole) of 4-trifluoromethyl-o-phenylenediamine and 10.4 grams (0.1 mole) of 2-methoxy propionic acid in 150 ml. of 4 N hydrochloric acid was refluxed for 5 hours. The solution was cooled, diluted with two volumes of water, and neutralized with 5 N ammonium hydroxide. A solid mixed with some oil was collected, washed with water, and dried. The dried solid was purified by stirring with activated alumina in ether solution to give the product as a tan solid, M.P. 125°–129– C.; 3.2 grams.

Application of the compound as the hydrochloride salt in water, as a pre-emergence treatment, at a rate of 4 pounds per acre, to foxtail, lamb's-quarter, Johnson grass, crab grass, pigweed, bindweed and water grass, gave a complete kill or non-emergence of all plants.

EXAMPLE IV

2-ethyl-5(6)-trifluoromethylbenzimidazole 4-trifluoromethyl-1,2-phenylenediamine was reacted with propionic acid according to the procedure of Example I to give 2-ethyl-5(6)-trifluoromethylbenzimidazole, M.P. 155°–158° C.

When applied as the hydrochloride salt in water, as a pre-emergence or a post-emergence treatment, at a rate of 4 pounds per acre, the compound gave a complete kill or non-emergence of mustard, foxtail, lamb's-quarter, pigweed, bindweed, water grass and wild oats without injury to cotton.

Concentrated compositions containing the active herbicidal agent which can be subsequently diluted, as with water, to the desired concentration for application to plants and soil are also provide. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active 5(6)-trifluoromethylbenzimidazoles with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

Since the compounds will form salts, such as with strong acids, they can be readily formulated as the salt of the compound in an aqueous solution. Particularly useful salts are the hydrochloride salts which are water-soluble and preferred for many applications.

The herbicidal compositions can include other beneficial adjuvants, such as humectants, oils and contact agents. Also other herbicides, such as sodium chlorate and the sodium borates or mixtures thereof, 2,3,6-trichlorobenzyloxypropanol, the chlorophenoxyacetic acids, trichlorobenzoic acids, substituted ureas, triazines, uracils and carbamates, can be included in the formulations.

The following example illustrates preparation of a suitable herbicidal formulation of a compound of the present invention.

EXAMPLE V

15% 2-ethyl-5(6)-trifluoromethylbenzimidazole
5% alkylarylpolyethyleneglycol surfactant
40% ethylene glycol
40% isopropanol The above liquid formulation can be diluted with water to form an emulsion and the emulsion sprayed with conventional spray equipment on soil or plants.

Other modes of applying the principle of the invention may be employed, change being made as regards the details described, provided the features stated in any of the following claims or the equivalent of such be employed.

We claim as our invention:

1. A 5(6)-trifluoromethylbenzimidazole compound of the formula

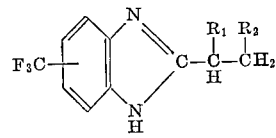

in which the $F_3C-$ radical is at the 5(6) position, $R_1$ is methyl or methoxy, and $R_2$ is hydrogen or combined with $R_1$ to represent $-CH_2-$.

2. A compound according to claim 1 in the form of a hydrochloride salt.
3. 2-isopropyl-5(6)-trifluoromethylbenzimidazole.
4. 2-cyclopropyl-5(6)-trifluoromethylbenzimidazole.
5. 2-(α-methoxyethyl)-5(6)-trifluoromethylbenzimidazole.

References Cited by the Examiner

Elderfield: Jour. Amer. Chem. Soc., volume 73, pages 977–983 relied on (1951).

Morgan: Jour. Chem. Soc. (London), 1961, pages 2345 and 2347 relied on.

WALTER A. MODANCE, *Primary Examiner.*

N. TROUSOF, *Assistant Examiner.*